R. C. KNOLL.
PROCESS OF AND APPARATUS FOR ELECTRIC ARC WELDING.
APPLICATION FILED APR. 17, 1920.
1,381,647.                                    Patented June 14, 1921.
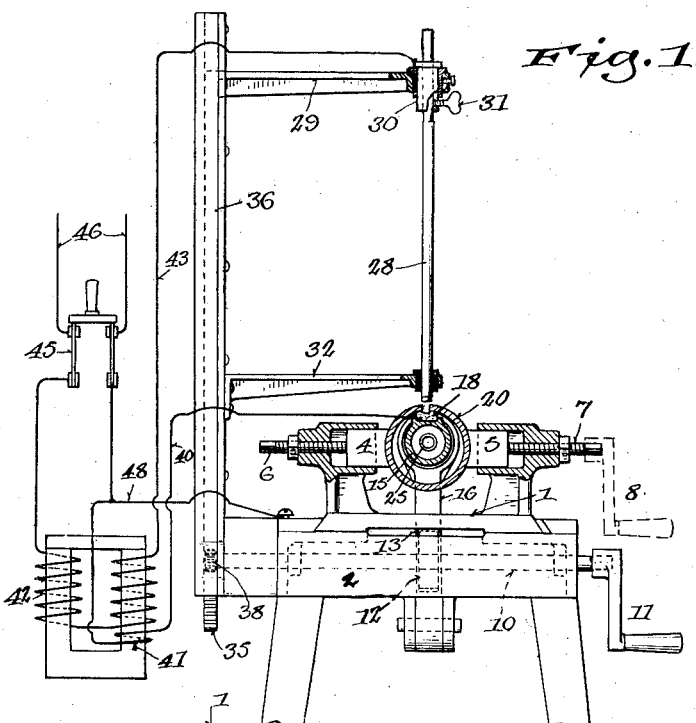
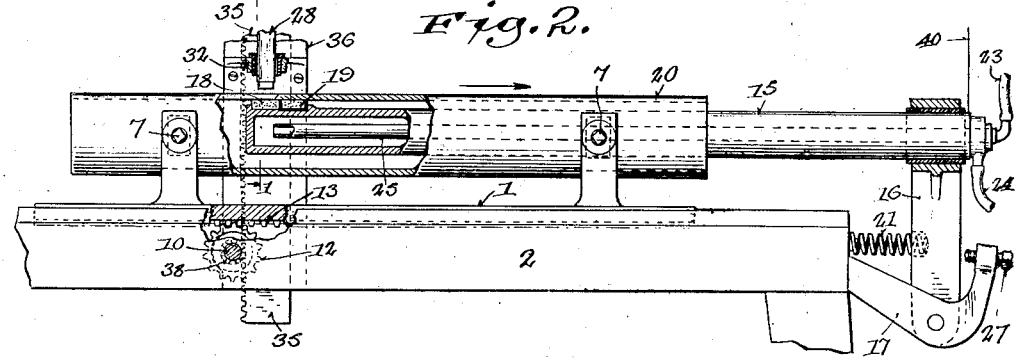
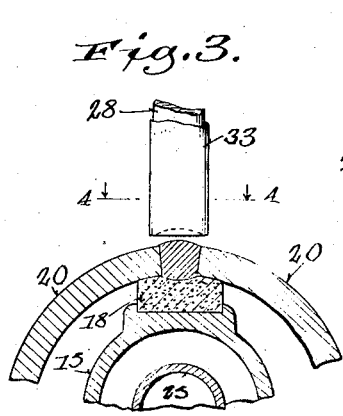
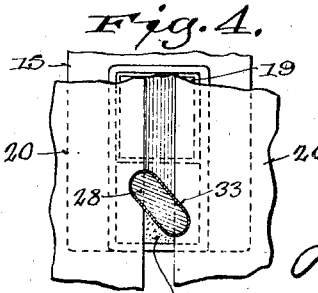
Inventor:
Roy C. Knoll.
By Bottum Bottum Hudnall & Coker
Attorneys.

UNITED STATES PATENT OFFICE.

ROY C. KNOLL, OF MILWAUKEE, WISCONSIN.

PROCESS OF AND APPARATUS FOR ELECTRIC-ARC WELDING.

1,381,647.  Specification of Letters Patent.  Patented June 14, 1921.

Application filed April 17, 1920. Serial No. 374,630.

*To all whom it may concern:*

Be it known that I, ROY C. KNOLL, a citizen of the United States, residing at Milwaukee, in the county of Milwaukee and State of Wisconsin, have invented certain new and useful Improvements in Processes of and Apparatus for Electric-Arc Welding, of which the following is a specification, reference being had to the accompanying drawing, forming a part thereof.

The main objects of this invention are to facilitate and expedite the continuous welding of two parts of a single or of separate pieces of metal together by means of an arc or arcs drawn from a fusible metallic electrode; to dispense with the welding ribbons, strips or wires which are commonly used in arc welding and which not only add materially to the cost but also complicate the operation of welding; to avoid setting up internal strains and stresses in the metal which cause cracks, scale, disintegration or porosity in the metal and consequently weak and defective welds; to produce a strong, homogeneous union of the welded parts; to heat the inner or lower edges of the parts to be united preliminary to their fusion by the electric arc whereby overheating and burning away of the outer edges is avoided, the faces to be joined are uniformly and completely fused by the arc and a continuous and homogeneous union with the metal supplied thereto by the fusible electrode is otained; to confine or support the fused metal in place between the parts to be united until it sets; to gradually cool and anneal the metal forming the joint whereby strains and stresses and resulting cracks, porosity and disintegration which cause weak and defective welds are avoided; and generally to improve processes of and apparatus for continuously uniting metal parts, particularly of heavy gage sheet metal, by means of an electric arc.

The invention consists in the process or method and in the construction, arrangement and combination of parts of a machine or apparatus for carrying out the process or method as hereinafter particularly described and pointed out in the claims.

In the accompanying drawing, illustrating a simple machine or apparatus constructed and designed to operate in accordance with the invention, more particularly for welding tubes or tubular articles, like characters designate the same parts in the several figures.

Figure 1 is a view partly in end elevation and partly in vertical cross section on the line 1—1, Fig. 2, of the machine, the electric circuit connections being shown diagrammatically; Fig. 2 is an enlarged detail view partly in vertical longitudinal section, of the work carriage and associated parts of the machine in connection with a tube in position for welding; Fig. 3 is a view on a still larger scale of a portion of a fusible electrode, supporting member, heating element and tube, the supporting member, heating element and tube being shown in cross section on the line 1—1, Fig. 2; and Fig. 4 is a cross section on the line 4—4, Fig. 3, of the electrode, showing its oblique working relation to the parts to be welded and the gap between them.

The machine or apparatus shown to illustrate the invention as adapted and applied to the welding of tubular work, comprises a carriage 1, guided and movable horizontally on a suitable frame 2. The carriage is provided with adjustable clamps 4 and 5, for holding the work in proper position for welding. The clamps, of which there may be any number of pairs according to the length of the tubes to be welded, are movable toward and from each other, and may be adjusted and operated by any suitable means, such as screws 6 and 7. One of each pair of screws, as the screw 7 on the front side of the machine, may be provided as indicated in Fig. 1, with a crank 8 to facilitate shifting one of the clamps toward and from the other, for grasping or releasing a tube.

Relative movement between the work and the heating and welding members of the machine for progressively making a weld, may be effected in various ways. As shown, the carriage with the work held thereon, is traversed longitudinally by means of a shaft 10 mounted in the frame 2 transversely to the carriage ways, and provided with a crank 11 and with a pinion 12, which meshes with a longitudinal rack 13 on the carriage.

A tubular arm or supporting member 15 is carried at one end above and lengthwise of the carriage 1 by an upright arm 16, hinged or pivoted at its lower end to a bracket 17 attached to the frame. Adjacent its other end the arm or member 15 is provided on the upper side with a heating block or element 18, and an insulated annealing or cooling block 19, of refractory material such as carbon, adapted to engage with the under sides of the opposing edges or parts of a tube 20 held by the clamps 4 and 5 on the carriage 1, in position for welding. The blocks 18 and 19 are pressed upwardly and held in yielding engagement with the work by a spring 21, interposed between the frame 2 and arm 16.

The tubular arm 15 may be provided, as shown in Fig. 2, with hose or flexible pipe connections 23 and 24, for circulating water or other cooling fluid through it if necessary or desirable, the inlet connection 23 being extended by a pipe 25 within and lengthwise of the tubular arm to a point adjacent the blocks 18 and 19, and the outlet connection 24 leading directly out from the opposite end of said arm.

The bracket 17 is extended and provided with an adjustable stop screw 27, for limiting the upward movement of the arm or member 15 by the spring 21 when the arm 15 is released by the withdrawal of a tube therefrom.

A fusible metallic electrode 28 is carried with its lower end above and opposite the opposing edges of the tube to be welded, over the heating block or element 18, by a vertically movable arm 29, with which it is detachably and adjustably connected at its upper end by an insulated sleeve or holder 30 and a thumb screw 31, or other suitable fastening device. The electrode, which is of oblong shape in cross section, as shown in Fig. 4, is held obliquely over and across the gap between the opposing edges or parts of the tube to be welded. It is provided with a covering or coating 33, of suitable insulating material, to prevent the arc drawn from its lower end from working upward and burning away the electrode unevenly at the sides.

The arm 29 may be fed downward with the fusible electrode toward the work by any suitable means. For this purpose it is shown as attached to a vertically movable rack bar 35 guided in a standard 36 rising from the rear side of the frame 2.

As the electrode 28 is consumed in making a weld, it is moved downward with the arm 29 toward the work at the proper rate, according to the cross sectional area of the electrode, the thickness of the parts to be welded, the rate of movement of the work past the electrode and other varying conditions, by a pinion 38 meshing with the rack bar 35. The pinion 38 may be regarded as representing change speed gearing by which the rate of feed of the electrode may be varied relative to the rate of feed of the work.

The heating block or element 18 and the fusible electrode 28 are included in separate electric circuits, which may be supplied from the same or different sources with currents of different characteristics, a current of comparatively low voltage and high amperage or heating power being supplied to the block or heating element 18, and a current of higher voltage being supplied to the electrode and work for drawing an arc between the electrode and the work and fusing the opposing faces of the parts to be united together with metal supplied from the electrode to fill the gap between the parts.

These currents may be supplied from secondary coils of a welding transformer or from separate reactance coils, or other sources. As shown in Fig. 1, the heating block or element 18 is connected by a conductor 40 with a terminal of a separate winding or induction coil 41 of comparatively few turns on the core of a reactance coil 42, and the fusible electrode 28 is connected by a conductor 43 with a terminal of the reactance coil, which is connected through a switch 45 with line conductors or supply mains 46. The circuits of the heating element 18 and electrode 28 are completed through the work, the clamps 4 and 5, carriage 1, frame 2 and conductors 48, which may be in part common to both circuits, as shown.

In the operation of the machine for welding tubes or tubular articles in accordance with the invention, the switch 45 being open and the carriage 1 withdrawn to the extreme left with reference to Fig. 2, a tube 20 or the like, is secured in place thereon between the clamps 4 and 5, with the gap between its edges on the upper side in alinement with an electrode 28 suspended from the arm 29 and passing loosely through the guide arm 32. The end of the arm 15 carrying the blocks 18 and 19, is depressed, and the carriage moved to the right till the heating block 18 is entered in the tube. The arm 15 being released, the block 18 is pressed upwardly by the spring 21 against the edges of the tube 20 on the underside thereof. As soon as the electrode 28 is brought into contact with the work, the circuits, including the heating block or element 18 with the coil 41 and the electrode with the coil 42, are established. The inner or lower edges of the tube with which the heating block is in contact are immediately heated to a high temperature, the coil 41 being constructed to supply a current of comparatively low voltage and high amperage or heating power. At the same time, the arc or arcs drawn and maintained between the fusible electrode 28 and the outer or upper edges of the tube evenly and completely fuses the faces to be united from the outer to the inner side of the tube, and the metal supplied by the simultaneous fusion of the lower end of the electrode coalesces with the fused faces to be united, fills the gap between them and forms a strong continuous and homogeneous union of the parts, the coil 42 being constructed to supply a current of comparatively high voltage which will produce and maintain the welding arc or arcs.

The preliminary and independent heating of the inner or lower edges of the tube, particularly in welding heavy gage or comparatively thick stock or parts, preparatory to fusion by the electric arc of the faces to be united, avoids overheating and breaking down of the outer or upper edges from which the arc is struck or drawn, before the inner or lower edges are affected, and thus facilitates the even fusion of the entire area of the opposing faces to be united and materially expedites the welding operation.

The employment of a fusible metallic electrode in connection with the preliminary or simultaneous heating of the inner or lower edges of the parts to be welded independently of the electric arc, supplies the metal required to fill the gap between the parts, thereby doing away with separate metallic welding ribbons, strips or wires which have been used in arc welding, and which besides being expensive, complicate the welding operation. The use of the fusible electrode as herein set forth also avoids the necessity of pressing the fused edges or parts of tubes or hollow articles together in forming welds, and thus setting up strains or stresses which tend to weaken the welds.

After the arc is struck in starting a weld, the carriage is gradually fed with the work, to the right, as indicated by an arrow in Fig. 2, and the fusible electrode as it is consumed, is gradually fed downward toward the work by the crank shaft 10 and its connections with the carriage and with the arm from which the electrode is suspended.

The heating block or element 18 not only serves to heat the inner or lower edges of the parts to be welded preparatory to and independently of their fusion by the electric arc, but also serves to confine or hold the fused metal forming the weld in place till it cools and sets.

The insulated annealing or cooling block 19 with which the work is brought into contact after passing the heating block or element 18, and which is heated to a moderate temperature by contact with the work, prevents the sudden chilling or cooling of the welded joint and resulting strains and stresses, which tend to produce cracks in the metal, and flaky, porous, weak or defective welds.

The opposing edges or faces of the parts to be welded together should be adjusted and held in the machine parallel with each other and in true alinement with the electrode 28, the gap or space between the parts not exceeding in width the thickness of the stock or parts to be united.

The fusible electrodes for use in this machine may be made from round wire or rods of steel or other metal having the requisite properties for welding metals of various kinds, the wire or rods being rolled and flattened into oblong shape in cross section and cut to proper lengths.

The oblong shape of the fusible electrodes and the oblique position in which they are held and presented to the work, concentrate the arc or arcs drawn therefrom and the heat thereof on the opposing edges or faces to be fused, facilitating and expediting the fusion thereof, as well as the fusion of the electrodes themselves and the filling of the gaps between the fused edges or faces of the work.

Although the machine or apparatus shown and described is specially designed for welding tubing or tubular articles, the method or process involved in the operation of the machine or apparatus is equally applicable to welding separate parts or pieces of various sizes and shapes, and various changes may be made in the construction and arrangement of parts of the machine or apparatus to adapt it to various kinds of work and metals of different kinds, without departure from the principle and scope of the invention as defined in the following claims.

I claim:

1. The process of electric arc welding which consists in heating on one side the juxtaposed parts to be welded by an electric current of comparatively low voltage and high amperage and fusing the heated parts together by an arc drawn from an electrode presented to the opposite side of the work with a current of higher voltage.

2. The process of electric arc welding which consists in heating on one side the juxtaposed parts to be welded with a current of comparatively low voltage and high amperage and fusing the heated parts together with metal supplied thereto from a fusible electrode presented to the opposite side of the work by an arc drawn between the electrode and the work with a current of higher voltage.

3. The process of electric arc welding which consists in heating the parts to be welded by contact therewith on one side of a refractory heating element through which a current of comparatively low voltage and high amperage is passed, and fusing the opposing faces of the heated parts together with metal supplied from a fusible electrode presented to the opposite side of the work by means of an arc drawn between the electrode and the work, with a current of higher voltage.

4. The process of electric arc welding which consists in heating on the under side the juxtaposed parts to be welded by contact therewith of a refractory heating element through which is passed a current of comparatively low voltage and high amperage, fusing the opposing faces of the parts together with metal supplied from a fusible electrode presented to the upper side of the work by an arc drawn between the electrode and the work with a current of higher voltage, and confining the fused metal between the opposing faces to be united until it sets by means of said heating element.

5. The process of electric arc welding which consists in heating the lower portions of the juxtaposed parts to be united by passing a current of comparatively low voltage and high amperage through a refractory heating element located below and spanning the gap between said parts, fusing the opposing faces of the parts with metal supplied from a fusible electrode presented to the upper side of the work by an arc drawn between the electrode and work with a current of higher voltage, and gradually cooling the metal forming the weld by contact with an element maintained at a lower temperature than that of said heating element during the welding operation.

6. In apparatus for electric arc welding the combination of a support provided with a heating element adapted to contact with juxtaposed parts of the work to be welded on one side thereof, a fusible metallic electrode arranged on the opposite side of the work from the heating element, means for causing relative movement between the work and the electrode and heating element, and means for simultaneously passing electric currents of different voltages through the heating element and through the electrode and work.

7. In apparatus for electric arc welding the combination of a fusible metallic electrode, a refractory heating element arranged to contact with juxtaposed parts to be welded on opposite sides of the gap between them and on the opposite side of the work from the electrode, means for causing relative movement between the work and the electrode and heating element, means for feeding the electrode as it is consumed toward the work, and electric circuits for passing a current of comparatively low voltage and high amperage through the heating element and a current of higher voltage through the electrode and work.

8. In apparatus for electric arc welding the combination of a fusible metallic electrode, a support provided with a refractory heating element arranged to contact with the juxtaposed parts to be welded on the opposite side of the work from the electrode, a second refractory element held on the work support adjacent the other element and in position to contact with a weld as it progresses, separate electric circuits including the electrode and work and the refractory heating element, and means for simultaneously maintaining currents of different voltages in said circuits, said refractory elements being arranged to confine the fused metal in the gap between the parts to be united as a weld is being made, and to retard the cooling of the fused metal forming the weld.

9. In apparatus for electric arc welding the combination of a fusible metallic electrode included in a circuit adapted for a current of comparatively high voltage, a hollow support, a refractory heating element carried by said support in position to contact with the parts to be welded together and to close the gap between and below them opposite the electrode, an electric circuit for simultaneously supplying a current of lower voltage and correspondingly high heating power to said heating element, and means for circulating a cooling medium through said support.

10. In apparatus for electric arc welding the combination of a work support for holding parts to be welded in juxtaposition with a gap between them, a fusible metallic electrode of oblong cross section and means for carrying the electrode over and obliquely across the gap between the parts to be welded as the weld progresses.

In witness whereof I hereto affix my signature.

ROY C. KNOLL.